US010578746B2

(12) United States Patent
Miya et al.

(10) Patent No.: US 10,578,746 B2
(45) Date of Patent: Mar. 3, 2020

(54) CONVERSION DEVICE AND COMPUTER READABLE MEDIUM

(71) Applicant: Mitsubishi Electric Corporation, Chiyoda-ku (JP)

(72) Inventors: Masakazu Miya, Tokyo (JP); Yuki Sato, Tokyo (JP); Seigo Fujita, Tokyo (JP); Kazuhiro Terao, Tokyo (JP); Masayuki Saito, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 447 days.

(21) Appl. No.: 15/319,188

(22) PCT Filed: Jun. 16, 2015

(86) PCT No.: PCT/JP2015/067251
§ 371 (c)(1),
(2) Date: Dec. 15, 2016

(87) PCT Pub. No.: WO2015/194527
PCT Pub. Date: Dec. 23, 2015

(65) Prior Publication Data
US 2017/0123072 A1 May 4, 2017

(30) Foreign Application Priority Data

Jun. 17, 2014 (JP) .................................. 2014-124095
Oct. 31, 2014 (WO) .................. PCT/JP2014/079050

(51) Int. Cl.
*G01S 19/25* (2010.01)
*G01S 19/43* (2010.01)
(Continued)

(52) U.S. Cl.
CPC .............. *G01S 19/25* (2013.01); *G01S 19/07*
(2013.01); *G01S 19/35* (2013.01); *G01S 19/40*
(2013.01);
(Continued)

(58) Field of Classification Search
CPC .......... G01S 19/07; G01S 19/22; G01S 19/25;
G01S 19/35; G01S 19/40; G01S 19/41;
G01S 19/43
(Continued)

(56) References Cited

U.S. PATENT DOCUMENTS 6,326,916 B1    12/2001  Green
2011/0187590 A1  8/2011  Leandro

FOREIGN PATENT DOCUMENTS

JP       8-278360 A      10/1996
JP    2002-323552 A      11/2002
(Continued)

OTHER PUBLICATIONS

Office Action dated Sep. 15, 2017 in Australian Patent Application No. 2015277932.

(Continued)

*Primary Examiner* — Dao L Phan
(74) *Attorney, Agent, or Firm* — Oblon, McClelland, Maier & Neustadt, L.L.P.

(57) ABSTRACT

A mechanism converts positioning correction information included in an SSR message as defined by "RTCM STANDARD 10403.2" to positioning correction information conforming to "RTCM 10402.3". A conversion device includes a computation processing section that acquires a plurality of types of positioning correction information conforming to "RTCM STANDARD 10403.2", an approximate position being a positioning result, and a satellite position of a satellite that transmits positioning information based on (Continued)

which the approximate position is calculated, and based on the types of positioning correction information, the approximate position, and the satellite position that have been acquired, generates pieces of element data, such as CLR and ORB, which are elements used for generating the types of positioning correction information conforming to "RTCM 10402.3", by computation, and a conversion calculation section that generates the types of positioning correction information conforming to "RTCM 10402.3", based on the pieces of element data.

8 Claims, 11 Drawing Sheets

(51) Int. Cl.
    *G01S 19/07*    (2010.01)
    *G01S 19/40*    (2010.01)
    *G01S 19/41*    (2010.01)
    *G01S 19/35*    (2010.01)
    *G01S 19/22*    (2010.01)

(52) U.S. Cl.
    CPC .............. *G01S 19/41* (2013.01); *G01S 19/43* (2013.01); *G01S 19/22* (2013.01)

(58) Field of Classification Search
    USPC .................................................. 342/357.64
    See application file for complete search history.

(56) References Cited

FOREIGN PATENT DOCUMENTS

| JP | 2004-3904 A | 1/2004 |
|---|---|---|
| JP | 2006-105721 A | 4/2006 |
| JP | 2009-63531 A | 3/2009 |
| JP | 2009-294067 A | 12/2009 |
| JP | 2010-112724 A | 5/2010 |

OTHER PUBLICATIONS

Koki Asari, et al., "PPP in practice based on SSR using QZSS", Heisei 26 Nendo The Institute of Positioning, URL:http://www.gnss-pnt.org/talkai26/yoko26/asari.pdf, Total 1 Page, (Apr. 25, 2014).

Tomoji Takasu, et al., "Study of Wide-Area Network-RTK System for Mobile Users", IEICE Technical Report, The Institute of Electronics, Information and Commnication Engineers, vol. 108, No. 169, Total 9 Pages, (Jul. 18, 2008).

H-J. Euler, et al., "Applicability of Standardized Network RTK Message for Surveying Rovers", Proceedings of the 16$^{th}$ International Technical Meeting of the Satellite Division of The Institute of Navigation (ION GPS/GNSS 2003), pp. 1361-1369, (Sep. 12, 2003).

B.E. Zebhauser, et al., "A Novel Approach for the Use of Information from Reference Station Networks Conforming to RTCM V2.3 and Future V3.0", Proceedings of The 2002 National Technical Meeting of The Institute of Navigation (NTM 2002), pp. 863-876, (Jan. 30, 2002).

International Search Report dated Sep. 15, 2015 in PCT/JP15/067251 Filed Jun. 16, 2015.

International Search Report dated Feb. 3, 2015 in PCT/JP14/079050 Filed Oct. 31, 2014.

Office Action dated May 16, 2017 in Japanese Patent Application No. 2016-529351 (with partial English translation).

Extended European Search Report dated Apr. 10, 2018 in Patent Application No. 15810325.9.

Kendall Ferguson, "The State and Status Special Committee—104", Radio Technical Commission for Maritime Services, XP055443014, Mar. 20, 2014, 10 pages.

Extended European Search Report dated Feb. 13, 2019 in Patent Application No. 18205228.2, 9 pages.

Fig. 3

| SSR MESSAGE POSITIONING CORRECTION INFORMATION ITEMS | MESSAGE TYPE NUMBERS AS DEFINED BY SSR MESSAGES OF RTCM STANDARD 10403.2 |
|---|---|
| SATELLITE ORBIT ERROR | MT1057/MT1063/MT1240*/MT1246* |
| SATELLITE CODE BIAS | MT1059/MT1065/MT1242*/MT1248* |
| SATELLITE PHASE BIAS | MT1265*/MT1266*/MT1267*/MT1268* |
| SATELLITE CLOCK ERROR | MT1058/MT1064/MT1241*/MT1247* |
| TROPOSPHERIC INFORMATION | — |
| IONOSPHERIC INFORMATION | — |

401

91

92

CONVERSION DEVICE AND COMPUTER READABLE MEDIUM

TECHNICAL FIELD

The present invention relates to a conversion device to convert positioning correction information (a first specification) used for determining a position to positioning correction information according to a different second specification, and relates to a program thereof.

BACKGROUND ART

In an autonomous positioning scheme in which a positioning device autonomously determines a position by using code information of a GNSS (Global Navigation Satellite System) signal from a satellite positioning system (GNSS) such as a GPS (Global Positioning System), a positioning accuracy is on the order of meters due to an error included in the GNSS signal.

In comparison with the autonomous positioning scheme using the code information, a positioning scheme using correction data of carrier phase information realizes highly accurate positioning on the order of centimeters. In particular, there is a scheme called an RTK (Realtime Kinematic) scheme or a network-type RTK scheme in which a GNSS signal is received at a plurality of electronic reference points (distributed at intervals of ten or so kilometers in Japan), the accurate positions of which are already known, to estimate an amount of error included in the GNSS signal inversely from the known positions of the electronic reference points, distribute it to a user as correction data, and perform positioning on the order of centimeters together with a GNSS signal acquired by a positioning device on the user's side (Patent Literature 1, for example).

On the other hand, the highly accurate positioning on the order of centimeters is also realized in a positioning scheme that uses an artificial satellite such as a quasi-zenith satellite to distribute correction data valid in a wide area nationwide. In this positioning scheme, the correction data is distributed from the quasi-zenith satellite to allow a positioning device to acquire the correction data even in an environment where communication via a wireless LAN, a mobile phone, or the like is not available. Then, the correction data is used to eliminate the error in the GNSS signal, so that the highly accurate positioning on the order of centimeters can be realized. In such a scheme that uses an artificial satellite to distribute correction data, the data capacity of a satellite circuit is limited, and thus the correction data is distributed in a state amount (State Space Representation) format or a vector format with a view to efficient distribution. Such a scheme using correction data to perform positioning on the order of centimeters is called an RTK (Realtime Kinematic)-PPP (Precise Point Positioning) scheme in "RTCM STANDARD 10403.2", for example (Patent Literature 2, for example).

In the RTK-PPP scheme, it is possible to perform positioning on the order of centimeters using positioning correction information (correction data) included in an SSR message as defined by "RTCM STANDARD 10403.2", for example.

However, a receiver of a generation supporting "RTCM 10402.3" cannot perform the positioning on the order of centimeters using the positioning correction information included in the SSR message as defined by "RTCM STANDARD 10403.2".

CITATION LIST

Patent Literature

Patent Literature 1: JP 2009-063531 A
Patent Literature 2: JP 2002-323552 A

SUMMARY OF INVENTION

Technical Problem

The present invention has been made in view of the above-described circumstances, and aims to provide means to convert positioning correction information included in an SSR message as defined by "RTCM STANDARD 10403.2" to positioning correction information supporting "RTCM 10402.3".

Solution to Problem

A conversion device according to the present invention includes:

a computation processing section to acquire a plurality of types of positioning correction information conforming to a first specification and used for correcting a positioning error resulting from a satellite that transmits positioning information and a positioning error resulting from a propagation path of the positioning information, an approximate position being a positioning result, and a satellite position of the satellite that transmits the positioning information based on which the approximate position is calculated, and based on the plurality of types of positioning correction information, the approximate position, and the satellite position that have been acquired, generate a plurality of pieces of element data which are elements used for generating a plurality of types of positioning correction information conforming to a second specification, by computation; and a conversion calculation section to generate the plurality of types of positioning correction information conforming to the second specification, based on the plurality of pieces of element data generated by the computation processing section.

Advantageous Effects of Invention

According to the present invention, it is possible to provide means to convert positioning correction information included in an SSR message as defined by "RTCM STANDARD 10403.2" to positioning correction information conforming to "RTCM 10402.3".

BRIEF DESCRIPTION OF DRAWINGS

FIG. 3 is a diagram of the first embodiment illustrating items of positioning correction information included in an SSR message;

DESCRIPTION OF EMBODIMENTS

First Embodiment (System Configuration)

Figure 1:
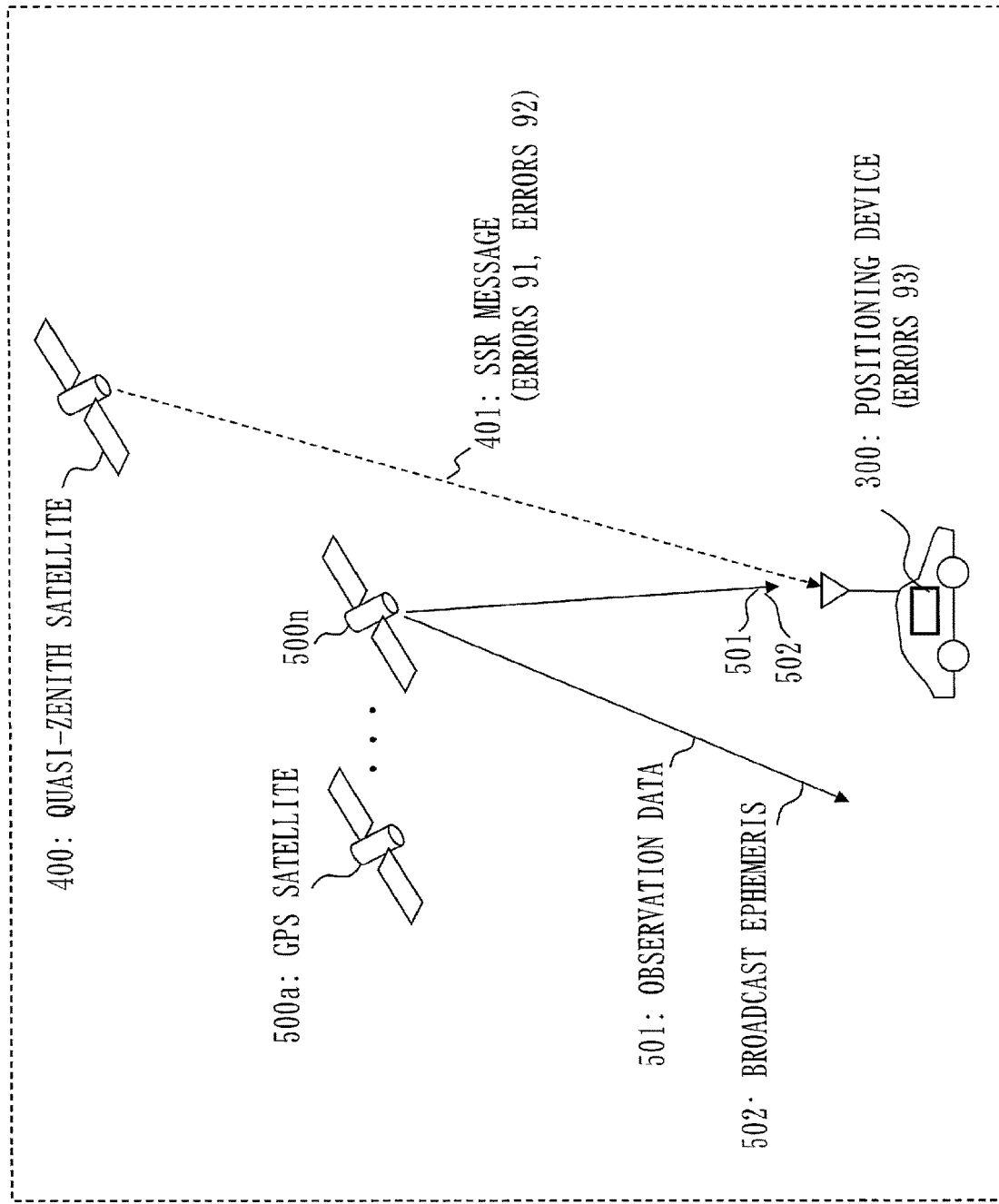
FIG. 1 is a diagram of a first embodiment illustrating an example configuration of a positioning system.

FIG. 1 is a diagram illustrating an example configuration of a positioning system according to a first embodiment. There will be described below an example in which a quasi-zenith satellite is used to distribute an SSR (State Space Representation) message including a plurality of types of positioning correction information (such as a satellite clock error and a satellite orbit error) and used for high-accuracy positioning with a positioning error on the order of centimeters. In place of the quasi-zenith satellite, a geostationary satellite such as a broadcast satellite may be used, or another satellite may be used as long as it has a function of uniformly broadcasting the positioning correction information to a wide area. Alternatively, the positioning correction information may be broadcast from a ground station.

There will be described below an example in which a GPS satellite is used as a positioning satellite. In place of the GPS satellite, a GNSS satellite such as GLONASS, Galileo, and BeiDou or an RNSS (Regional Navigation Satellite System) satellite such as a quasi-zenith satellite may be used.

With reference to FIG. 1, a positioning device 300 is mounted to a mobile body such as an automobile, for example. The positioning device 300 receives observation data 501 and a broadcast ephemeris 502 transmitted from a GNSS (GPS) satellite 500. The broadcast ephemeris 502 is also called an ephemeris. The positioning device 300 also receives an SSR message 401 transmitted from a quasi-zenith satellite 400 (also denoted as QZS).

The first embodiment is characterized in that a conversion device 103 of a conversion unit 100 included in the positioning device 300 performs processing to convert an SSR message as defined by "RTCM STANDARD 10403.2" (a first specification) to a pseudorange correction amount (Message Type 21) and a carrier phase correction amount (Message Type 20) as defined by "RTCM 10402.3" (a second specification) (A8 to be described later).

The quasi-zenith satellite 400 receives a plurality of types of positioning correction information from a ground station not illustrated in FIG. 1, and distributes the plurality of types of positioning correction information that have been received by including them in the SSR message 401.

The GPS satellite 500 transmits the observation data 501 and the broadcast ephemeris 502. The positioning device 300 needs to acquire four or more of the GPS satellite 500 in order to perform positioning.

(SSR Message 401)

Figure 2:
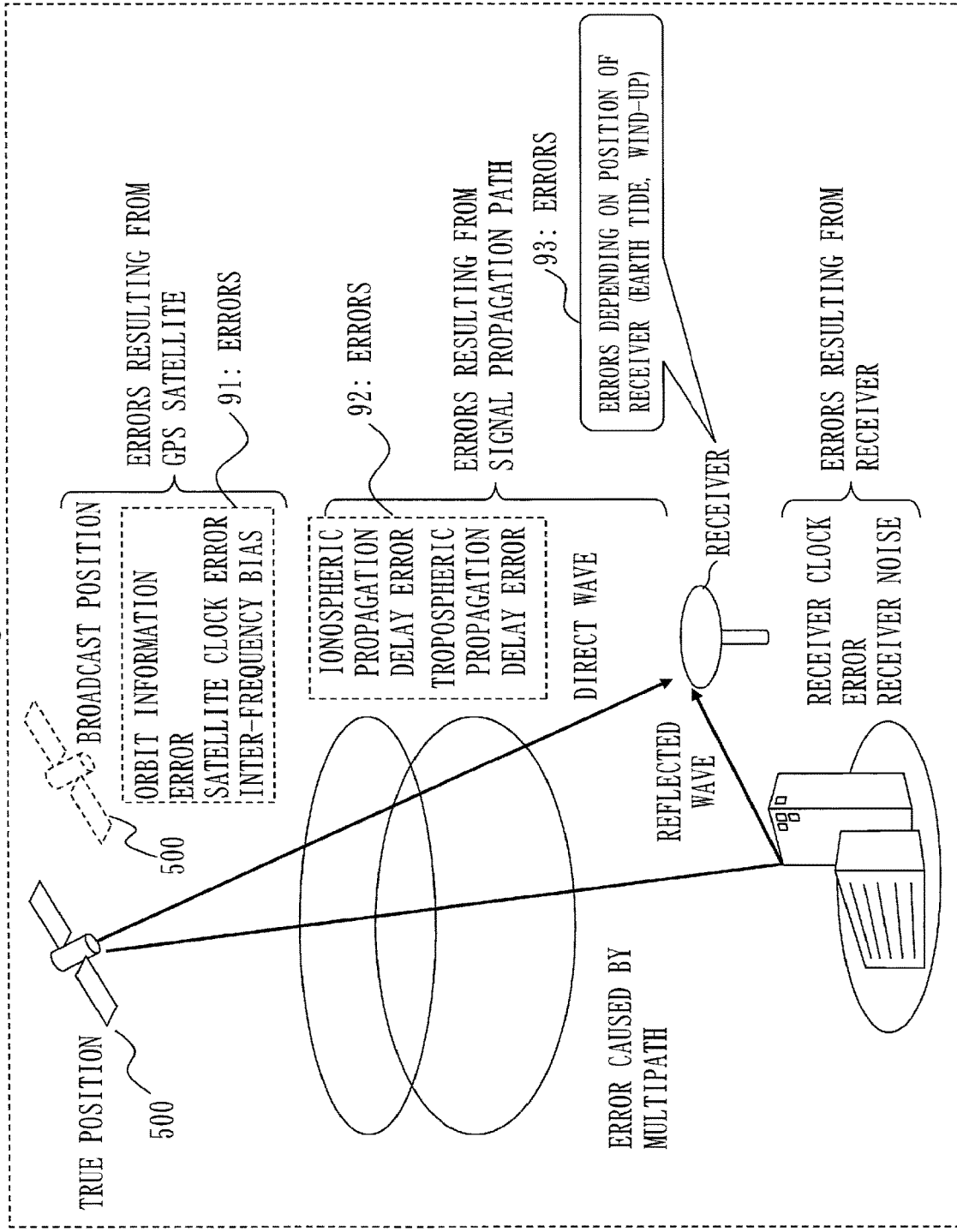
FIG. 2 is a diagram of the first embodiment illustrating sources of errors included in a GPS signal.

FIG. 2 is a diagram illustrating sources of errors included in a GPS signal. FIG. 2 is a diagram illustrating sources of a bias error, noise, and the like included in the observation data 501. Errors resulting from the GPS satellite 500 include an orbit error, a satellite clock error, and an inter-frequency bias (a portion indicated as errors 91). Errors resulting from a signal propagation path include an ionospheric propagation delay error (also called an ionospheric delay error or an ionospheric delay amount) and a tropospheric propagation delay error (also called a tropospheric delay error or a tropospheric delay amount) (a portion indicated as errors 92). Further, errors resulting from a receiver of the positioning device 300 include a receiver clock error, receiver noise, and a multipath error that is caused by an interference between a GPS signal reflected off a building and a GPS signal directly received from the GPS satellite 500.

Among these errors, the errors resulting from the receiver vary depending on the performance and reception environment of the receiver of the positioning device 300 used by a user, and are thus not included in the SSR message 401 distributed from the quasi-zenith satellite 400. The errors resulting from the receiver are eliminated by processing of the positioning device 300.

The errors resulting from the GPS satellite 500 and the errors resulting from the signal propagation path are compressed and distributed from the quasi-zenith satellite 400.

FIG. 2 further illustrates an error resulting from an earth tide effect and an error resulting from a phase wind-up effect that vary depending on the position of a positioning point (the position of the receiver of the positioning device), but these are not included in the SSR message 401. In the first embodiment, the error resulting from the earth tide effect and the error resulting from the phase wind-up effect are also taken into account (a portion indicated as errors 93).

FIG. 3 illustrates a correspondence between the plurality of types of positioning correction information included in the SSR message 401 distributed from the quasi-zenith satellite 400 (a left column in FIG. 3) and SSR Message Types as defined by "RTCM STANDARD 10403.2" (a right column in FIG. 3). "Reference numerals 91 and 92" indicated in FIG. 3 correspond to the errors 91 and the errors 92 in FIG. 1 and FIG. 2. Both of a satellite code bias and a satellite phase bias in FIG. 3 correspond to the inter-frequency bias in FIG. 2 (equivalent to a satellite signal bias to be described later). A satellite orbit error through ionospheric information illustrated in the left column in FIG. 3 are pieces of positioning correction information, and these pieces of positioning correction information are of respective types which are different from one another. Note that "MT" in the right column in FIG. 3 is an abbreviation for "Message Type". Also note that an asterisk symbol in the right column in FIG. 3 indicates a draft message definition under deliberation for standardization. Also note that a horizontal line in the right column corresponding to each of the tropospheric information and the ionospheric information in the left column in FIG. 3 indicates a draft message definition before deliberation for standardization.

Figure 4:
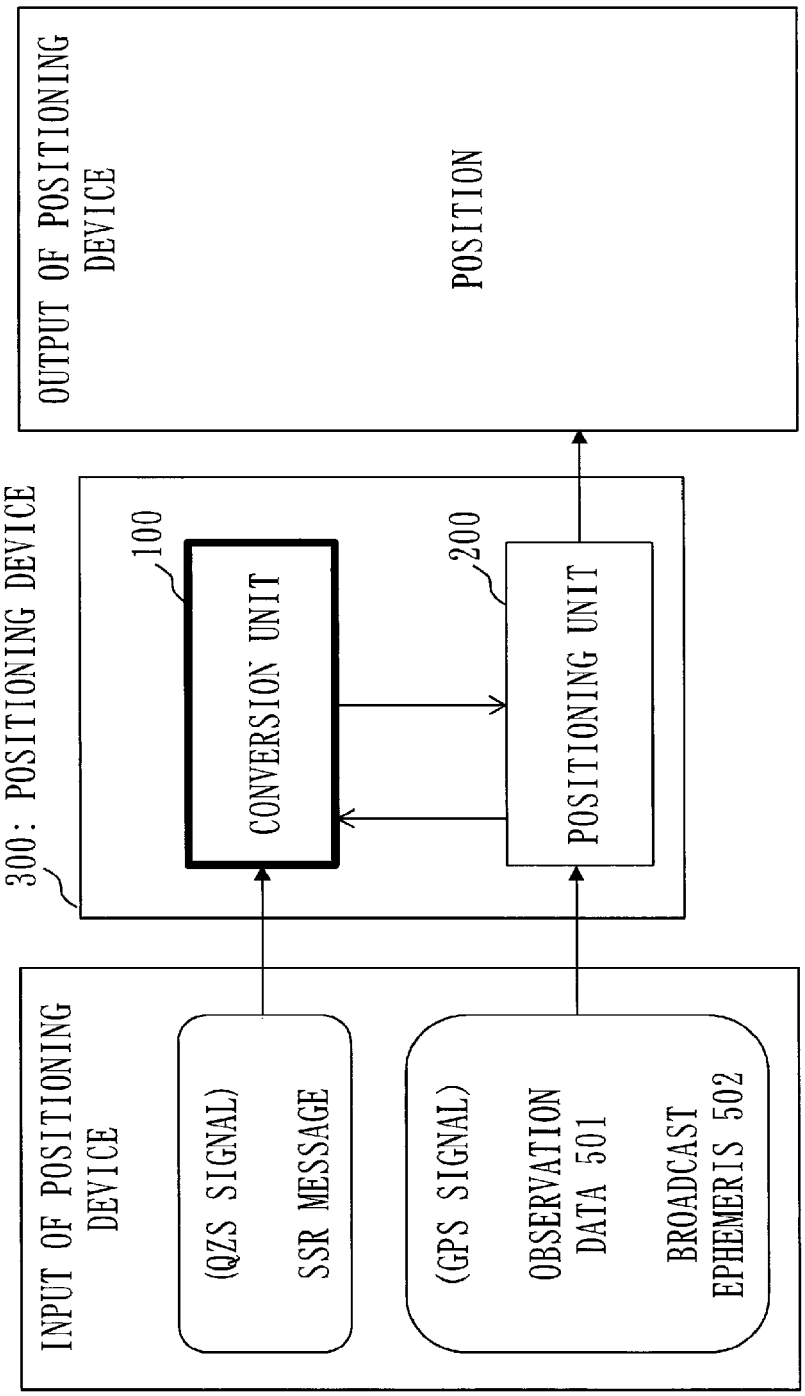
FIG. 4 is a diagram of the first embodiment illustrating input/output of a positioning device.

FIG. 4 is a diagram illustrating input/output of the positioning device. An overview of the operation of the positioning device 300 according to the first embodiment will be described. As will be described in detail later with reference to FIG. 5, the positioning device 300 includes the conversion unit 100 and a positioning unit 200.

In the positioning device 300, the positioning unit 200 receives the observation data 501 and the broadcast ephemeris 502 as a GPS signal, and the conversion unit 100 receives the SSR message 401 as a QZS signal, as illustrated in FIG. 4. Then, the positioning device 300 computes the position of the positioning point (the position of the positioning device 300) using the SSR messages 401 as well as the observation data 501 and the broadcast ephemeris 502.

Figure 5:
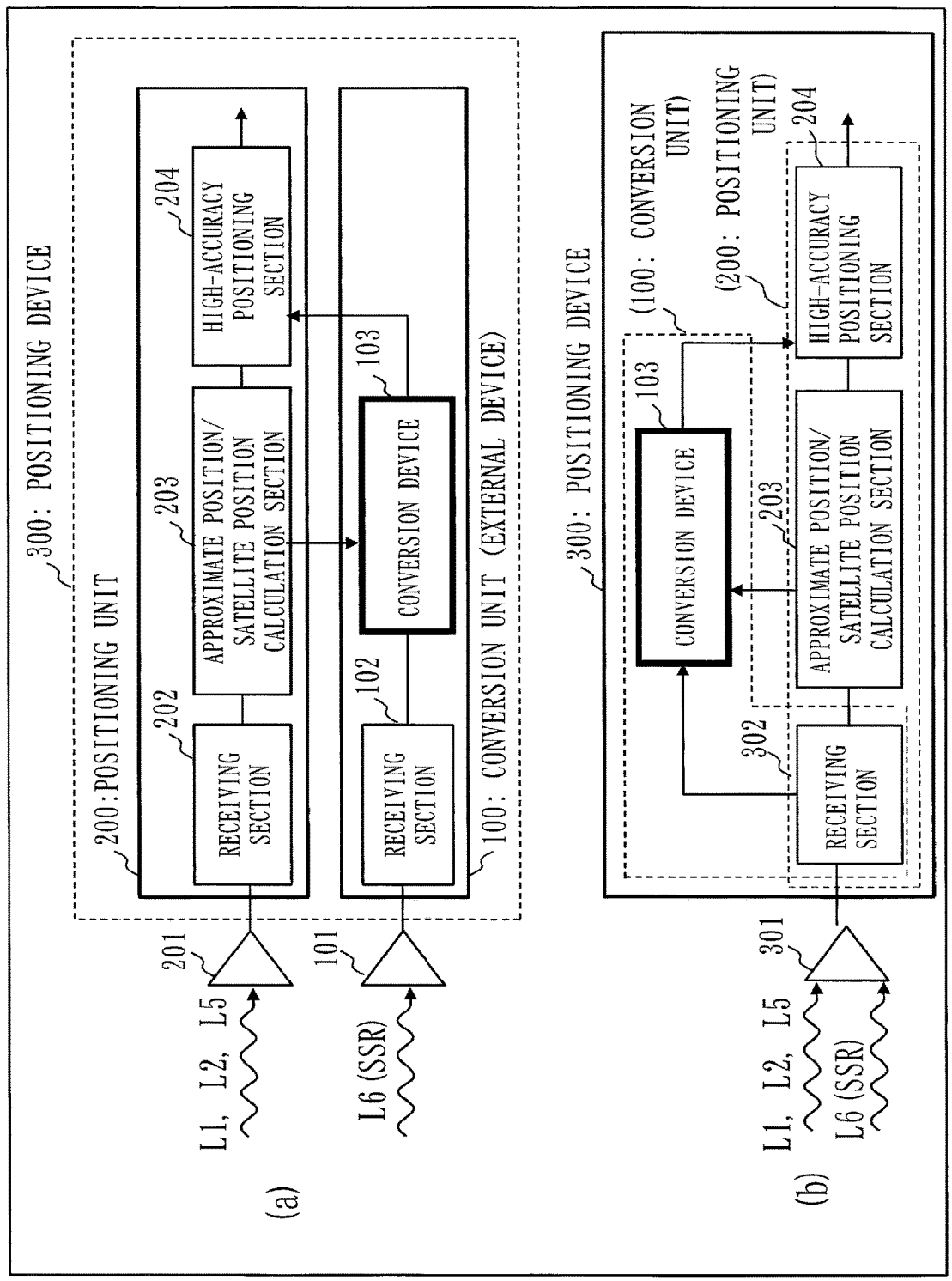
FIG. 5 is a diagram of the first embodiment and is a block diagram of the positioning device.

FIG. 5 illustrates two example configurations of the positioning device 300. (a) of FIG. 5 is an example in which the positioning device 300 is composed of separate devices. That is, the positioning device 300 is configured to include the conversion unit 100 and the positioning unit 200 as separate devices. (a) of FIG. 5 corresponds to such a case where the conversion unit 100 is externally added as a separate device to the positioning unit 200 of an old type.

(1) In (a) of FIG. 5, the conversion unit 100 receives the SSR message 401 (L6 band) including positioning correction information by an antenna 101 and a receiving section 102.

(2) Then, the conversion device 103 converts the positioning correction information included in the SSR message 401 to positioning correction information of Message Types of "RTCM 10402.3", and outputs it to a high-accuracy positioning section 204 of the positioning unit 200.

(3) For this conversion process, the conversion device 103 uses calculation results (an approximate position and a satellite position) of an approximate position/satellite position calculation section 203 (hereinafter called the satellite position calculation section 203) of the positioning device 300.

(4) In the positioning unit 200, an antenna 201 and a receiving section 202 receive "L1 band, L2 band, and L5 band signals" being the observation data 501, the broadcast ephemeris 502, and the like, and the satellite position calculation section 203 calculates the approximate position of the positioning device and the satellite position.

(5) The high-accuracy positioning section 204 performs high-accuracy positioning using the calculation results of the satellite position calculation section 203 and the calculation results of the conversion device 103.

(b) of FIG. 5 indicates a configuration in which the conversion unit 100 and the positioning unit 200 are incorporated as an integrated device (a positioning device), and the conversion unit 100 and the positioning unit 200 constitute the positioning device 300 as a unit both in terms of appearance and circuitry. The differences from (a) of FIG. 5 are that an antenna 301 functions as the antennas 101 and 201, and that a receiving section 302 functions as the receiving sections 102 and 202. The operation is substantially the same as that of the positioning device 300 of (a) of FIG. 5.

(1) In (b) of FIG. 5, the SSR message 401 (L6 band) including positioning correction information is received by the antenna 301 and the receiving section 302. (b) of FIG. 5 indicates the configuration in which "L1 band, L2 band, and L5 band signals" being the observation data 501, the broadcast ephemeris 502, and the like as well as the SSR message 401 (L6 band) are received by the single antenna 301 and the single receiving section 302.

(2) The conversion device 103 converts the positioning correction information included in the SSR message 401 to positioning correction information of Message Types in "RTCM 10402.3" by using results of the satellite position calculation section 203, and outputs it to the high-accuracy positioning section 204 of the positioning unit 200.

(3) The high-accuracy positioning section 204 performs high-accuracy positioning by using the positioning correction information of Message Types in "RTCM 10402.3" converted from the SSR message 401.

Figure 6:
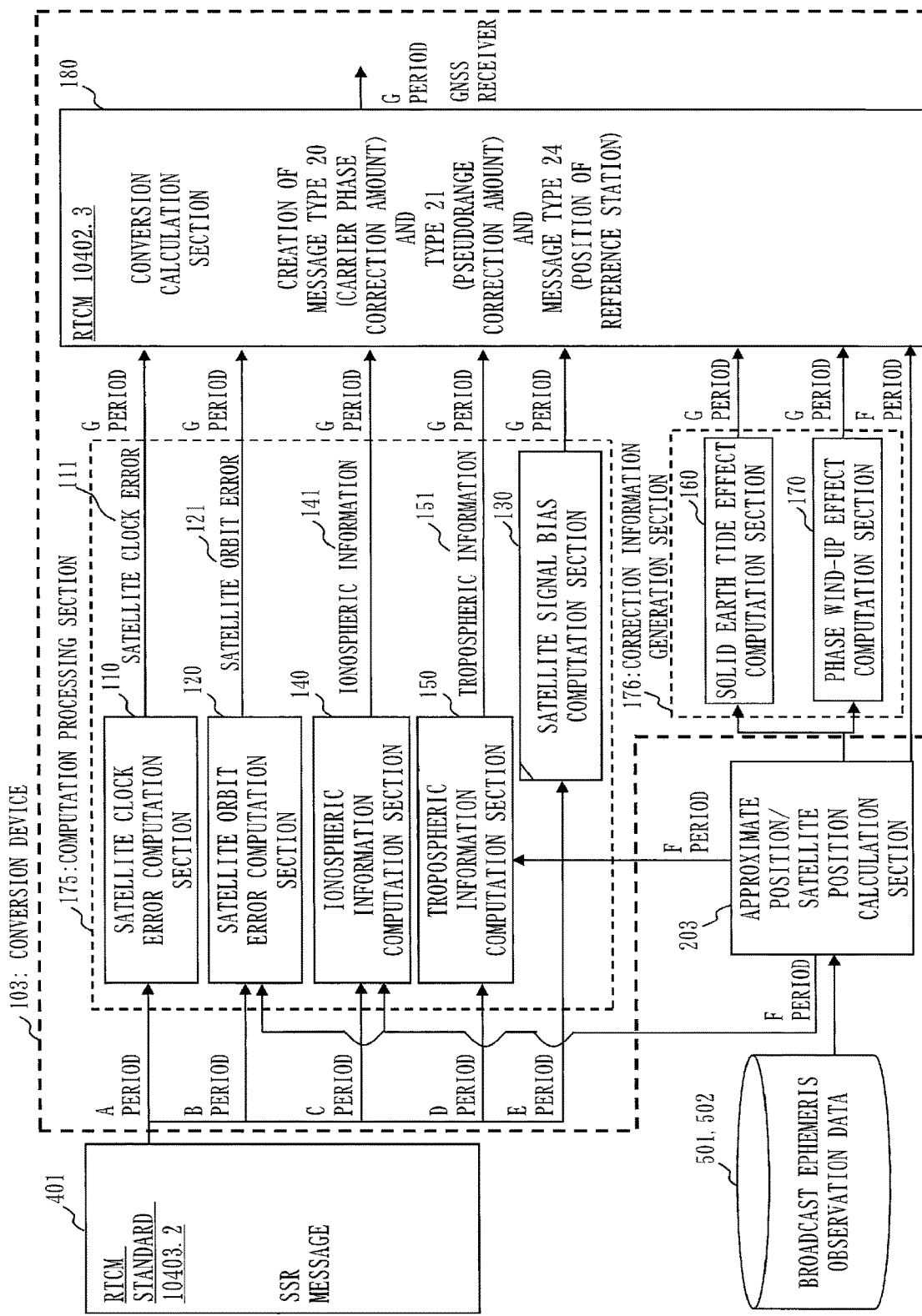
FIG. 6 is a diagram of the first embodiment and is a block diagram illustrating a configuration of a conversion device.

FIG. 6 is a block diagram illustrating a configuration of the conversion device 103. The conversion device 103 receives as input the SSR message 401 as well as an approximate position of the positioning device 300 itself, a satellite position, a satellite velocity, and the like which are calculation results of the satellite position calculation section 203. As illustrated in FIG. 6, the conversion device 103 includes a satellite clock error computation section 110, a satellite orbit error computation section 120, a satellite signal bias computation section 130, an ionospheric information computation section 140, a tropospheric information computation section 150, a solid earth tide effect computation section 160, a phase wind-up effect computation section 170, and a conversion computation section 180. The satellite clock error computation section 110 through the tropospheric information computation section 150 constitute a computation processing section 175. The solid earth tide effect computation section 160 and the phase wind-up effect computation section 170 constitute a correction information generation section 176. The function of each "section" will be described in detail below.

(Use of Output of Satellite Position Calculation Section 203)

With reference to FIG. 6, the satellite orbit error computation section 120 receives as input the satellite position, the satellite velocity, the approximate position, and the like from the satellite position calculation section 203. The ionospheric information computation section 140 and the tropospheric information computation section 150 receive as input the approximate position from the satellite position calculation section 203. The solid earth tide effect computation section 160 and the phase wind-up effect computation section 170 receive as input the satellite position, the approximate position, and the like from the satellite position calculation section 203.

(A. Generation of "RTCM STANDARD 10402.3" Message Types 20 and 21 from SSR Message)

The conversion device 103 according to the first embodiment performs processing to convert the SSR message as defined by "RTCM STANDARD 10403.2" to the pseudorange correction amount (Message Type 21 ) and the carrier phase correction amount (Message Type 20) as defined by "RTCM 10402.3" (A8 to be described later) and processing to create Message Type 24.

In the first embodiment, the conversion device 103 creates the pseudorange correction amount (Message Type 21), the carrier phase correction amount (Message Type 20), and Message Type 24 defined by "RTCM 10402.3" from the SSR message. This allows a receiver of an old generation supporting "RTCM 10402.3" to perform positioning according to a network-type RTK scheme using existing virtual reference points as a reference station (VRS-RTK). In the present first embodiment, the creation of the pseudorange correction amount (Message Type 21) and the carrier phase correction amount (Message Type 20) as defined by "RTCM 10402.3" will be described. There will be described an example in which L1 band and L2 band signals are used as satellite signals. In place of the L1 band and L2 band signals, L5 band signals may be used.

(A1.Satellite Clock Error Computation Section 110)

The satellite clock error computation section 110 generates a satellite clock correction amount CLK. The satellite clock correction amount CLK is obtained according to the following formula which is a formula for calculating CLK(t) by using polynomial coefficients C0, C1, and C2 and a reference time $t_0$ included in the satellite clock error information in the SSR message.

$$CLK(t) = C0 + C1(t - t_0 + A/2) + C2(t - t_0 + A/2)^2 \times 10^{-3} \, [m]$$

Note that t is the time when this computation is performed, and A is a constant defined by the specification of the conversion device (the positioning device). The details are as defined in Section 3.5.12.6 of "RTCM STANDARD 10403.2".

It is calculated with a G period, and is used as an input value for computing a carrier phase correction amount CPC (Carrier Phase Correction) in Message Type 20 (A8 to be described later) and a pseudorange correction amount PRC (PseudoRange Correction) in Message Type 21 (A8 to be described later) of "RTCM 10402.3".

As described above, CLK(t) is determined based on C0, C1, C2, the reference time $t_0$, and so on in the SSR message.

(A2. Satellite Orbit Error Computation Section 120)

The satellite orbit error computation section 120 computes a satellite orbit correction amount ORB(t) indicated below. The satellite orbit correction amount ORB is obtained according to Formula 2 by using an orbit error vector, as indicated in Formula 1, which is included in the satellite orbit error information in the SSR message.

$$O = (O_{radial}, O_{along}, O_{cross})$$ [Formula 1]

It is calculated with the G period, and is used as an input value for computing the carrier phase correction amount CPC in Message Type 20 and the pseudorange correction amount PRC in Message Type 21 of "RTCM 10402.3".

$$ORB(t) = e_{LOS}(t) \cdot \delta X(t)[m]$$ [Formula 2]

Note Formula 3.

$$e_{LOS}(t) = r(t) - r_s(t)$$ [Formula 3]

$$\delta X(t) = O_{radial} e_{radial}(t) + O_{along} e_{along}(t) + O_{cross} e_{cross}(t)$$

$$e_{along}(t) = \frac{\dot{r}(t)}{|\dot{r}(t)|}$$

$$e_{cross}(t) = \frac{r(t) \times \dot{r}(t)}{|r(t) \times \dot{r}(t)|}$$

$$e_{radial}(t) = e_{along}(t) \times e_{cross}(t)$$

Note that t is the time of a terminal when this computation is performed.

$$r, \dot{r}$$ [Formula 4]

Formula 4 indicates a position vector and a velocity vector of a satellite in an ECEF coordinate system obtained by coordinate transformation from ECI coordinates.

$$r_s$$ [Formula 5]

Formula 5 indicates a position vector of a mobile station (a user) in the ECEF coordinate system obtained by coordinate transformation from ECI coordinates.

$$e_{LOS}$$ [Formula 6]

Formula 6 indicates a relative position vector of the satellite in relation to the mobile station (the user) in the ECEF coordinate system.

Therefore, all the vectors in the above formulas are vectors in the ECEF coordinate system. The position vector of the mobile station is computed using the approximate position of the mobile station, such as autonomous positioning results (coordinate values), for example. When the position of the mobile station (the user) is represented by latitude, longitude, and altitude, the WGS-84 ellipsoid or the GRS-80 ellipsoid is used as an earth model, for example. The position vector and the velocity vector of the satellite are calculated, for example, according to the formulas described in IS-GPS (Section 30.3.3.1.3 User Algorithm for Determination of SV Position in IS-GPS-200G), by using the broadcast ephemeris. The details are as defined in Section 3.5.12.6 of "RTCM STANDARD 10403.2".

As described above, ORB(t) is determined based on the orbit vector in the SSR message as well as the satellite position, the satellite velocity, the approximate position, and the like acquired from the satellite position calculation section 203.

(A3. Satellite Signal Bias Computation Section 130)

The satellite signal bias computation section 130 acquires satellite signal biases included in the SSR message 401, and outputs the acquired satellite signal biases to the conversion computation section 180 without change.

The satellite signal biases are composed of code biases (C1Bias and P2Bias) and carrier phase biases (L1Bias and L2Bias). With regard to the satellite signal biases, conversion processing is not required and the values included in the SSR message are directly used without change. The values remain constant until the next update time, and are used as input values for computing the carrier phase correction amount and the pseudorange correction amount in "RTCM 10402.3" with the G period.

As described above, the satellite signal bias computation section 130 outputs the acquired satellite signal biases to the conversion computation section 180 without change.

(A4. Ionospheric Information Computation Section 140)

The ionospheric information computation section 140 generates an ionospheric error ION by computation. The ionospheric information computation section 140 obtains the ionospheric error ION by using a "value of ionospheric information at a grid k" included in the SSR message 401. The "value of ionospheric information at the grid k" included in the SSR message 401 will be briefly described.

Figure 7:
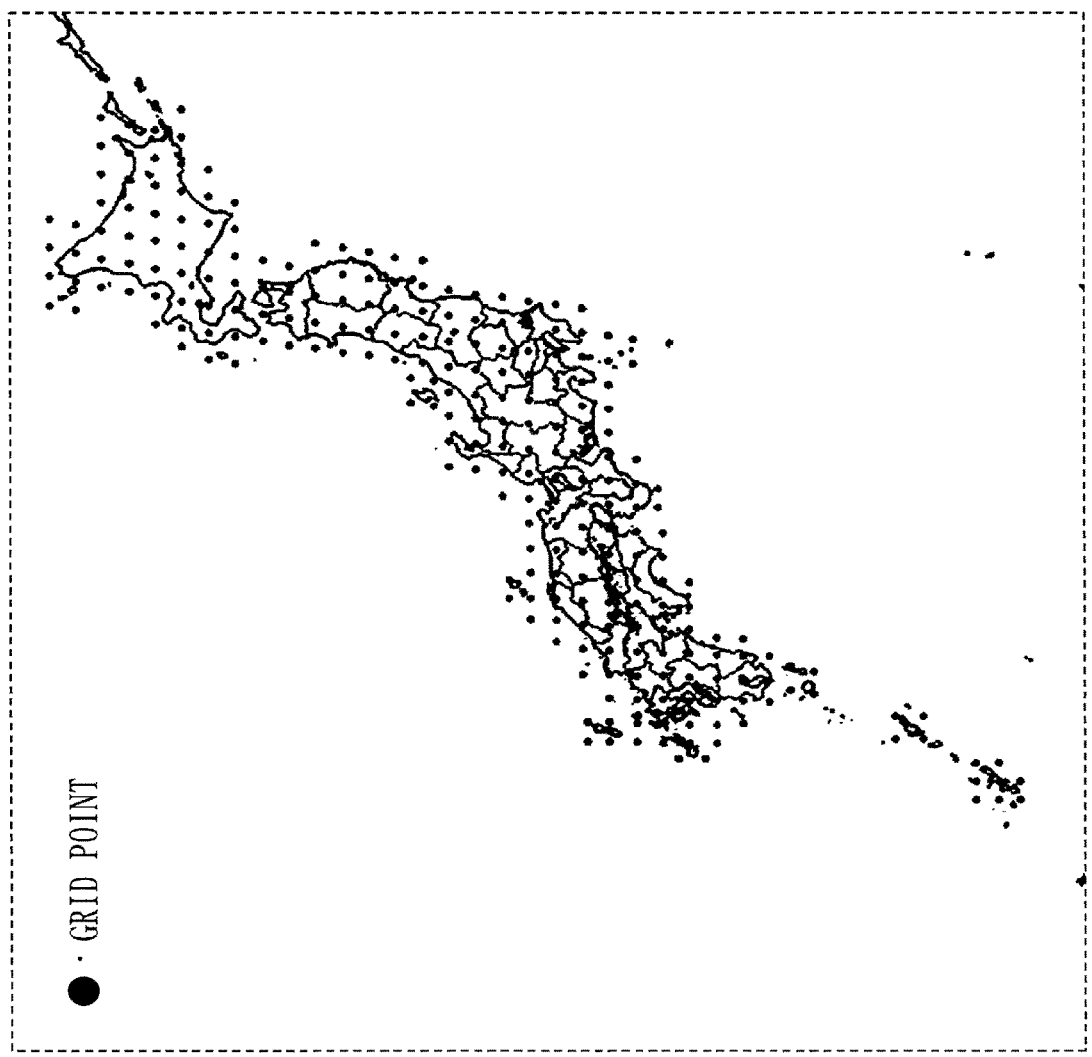
FIG. 7 is a diagram of the first embodiment illustrating grid points.

FIG. 7 is a diagram illustrating grid points 94. The ionospheric information in the SSR message 401 is generated and distributed for each grid point set at intervals of about 10 to 30 kilometers, for example.

Figure 8:
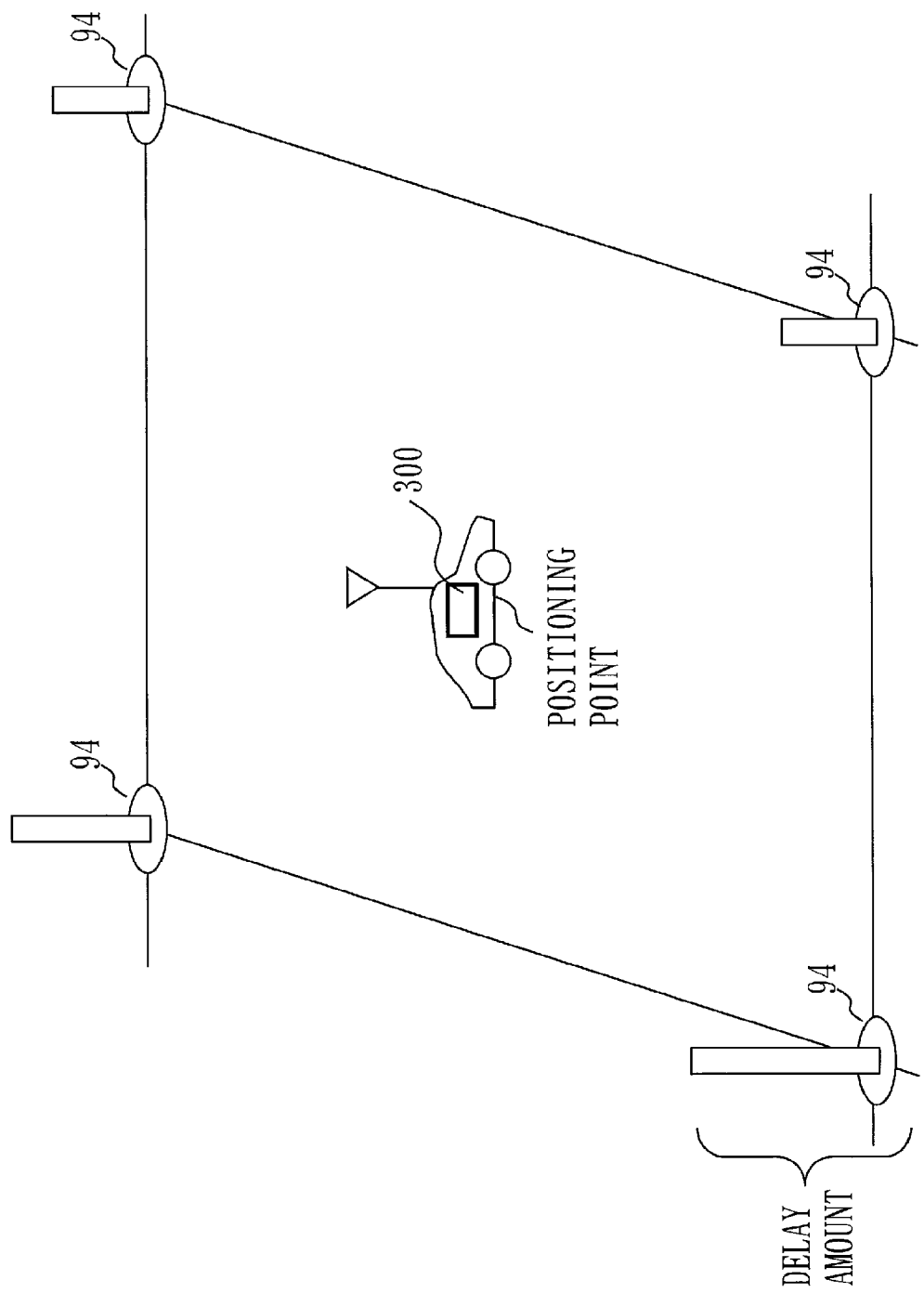
FIG. 8 is a diagram of the first embodiment illustrating a delay amount at a grid point.

FIG. 8 is a diagram illustrating an ionospheric delay error at each grid point 94. As illustrated in FIG. 8, the ionospheric delay error included in the SSR message 401 is assigned to each grid point 94. The ionospheric information computation section 140 obtains the ionospheric error ION by using the ionospheric delay error at each grid point 94. The ionospheric information computation section 140 acquires autonomous positioning results ($lat_{user}$, $lon_{user}$) being the approximate position of the mobile station (the positioning unit 200) from the satellite position calculation section 203, and based on the acquired autonomous positioning results ($lat_{user}$, $lon_{user}$), selects grid points 94 close to and surrounding the autonomous positioning results ($lat_{user}$, $lon_{user}$). The ionospheric information computation section 140 performs spatial interpolation by using the ionospheric delay errors assigned to the selected grid points 94. In this way, the ionospheric information computation section 140 calculates an ionospheric delay amount $ION^{PRN}_{user}$ in the autonomous positioning results ($lat_{user}$, $lon_{user}$) of the user with regard to each satellite. As the spatial interpolation, bilinear interpolation is used, for example. It is calculated with the G period, and is used as an input value for computing the carrier phase correction amount CPC in Message Type 20 (A8 to be described later) and the pseudorange correction amount PRC in Message Type 21 (A8 to be described later) of "RTCM 10402.3". Note that this computation may estimate a time-based transition using a previous SSR message and a predicted value may be used as the input value.

As described above, the ionospheric error ION is computed with the data provided for the grid k in the SSR message 401 as well as the approximate position and the like acquired from the satellite position calculation section 203.

(A5. Tropospheric Information Computation Section 150)

The tropospheric information computation section 150 generates a tropospheric error TROP by computation. The generation of the tropospheric error TROP is similar to that of the ionospheric error ION, The tropospheric information computation section 150 obtains the tropospheric error TROP by using tropospheric information at each grid point 94 included in the SSR message 401, as described below. Based on the autonomous positioning results ($lat_{user}$, $lon_{user}$) of the mobile station (the positioning unit 200), the tropospheric information computation section 150 selects grid points 94 close to and surrounding the autonomous positioning results ($lat_{user}$, $lon_{user}$). The tropospheric information computation section 150 performs spatial interpolation by using the selected grid points, and thereby calculates a tropospheric delay amount $T^{PRN}_{user}$ in the autonomous positioning results ($lat_{user}$, $lon_{user}$) of the user with regard to each satellite PRN. As the spatial interpolation, bilinear interpolation is used, for example.

When the tropospheric information is in a vertical direction, a tropospheric delay amount in a slant direction indicated in Formula 7 is calculated with Formula 8 by multiplication by a mapping function.

$$TROP_{user}^{PRN} \qquad \text{[Formula 7]}$$

$$TROP_{user}^{PRN} = T_{user\_std} M_{vd}^{PRN} \qquad \text{[Formula 8]}$$

Note that the Niell mapping function is used as the mapping function, for example. Reference Document: Niell A. E., Global mapping functions for the atmosphere delay at radio wavelengths, J. Geophys. Res., 101, 3227-246, 1996.

It is calculated with the G period, and is used as an input value for computing the carrier phase correction amount CPC in Message Type 20 and the pseudorange correction amount PRC in Message Type 21 of "RTCM 10402.3". Note that this computation may estimate a time-based transition using a previous SSR message and a predicted value may be used as the input value.

As described above, the tropospheric error TROP is computed with the data provided for the grid k in the SSR message 401 as well as the approximate position and the like acquired from the satellite position calculation section 203.

(A6. Solid Earth Tide Effect Computation Section 160)

The solid earth tide effect computation section 160 acquires the satellite position, the approximate position, and the like from the satellite position calculation section 203, and using these and an existing solid earth tide model, calculates a solid earth tide effect earthtide (correction information of a position-dependent error). The solid earth tide effect earthtide is an error that varies depending on the position of the positioning unit 200 being the mobile station (the user). The solid earth tide effect computation section 160 obtains it, as indicated below, by using the satellite position, autonomous positioning results (latitude, longitude, and elevation angle of the satellite) of the mobile station (the user), and the like.

$$earthtide(t) = e_{LOS}(t) \cdot earthtide_{ecef}(t) \qquad \text{[Formula 9]}$$

$$e_{LOS}(t) = r(t) - r_s(t) \qquad \text{[Formula 10]}$$

Formula 10 is a relative position vector of the satellite in relation to an observation point in the ECEF coordinate system, where t is the time of the receiver when the receiver performs the computation.

$$earthtide_{ecef} \qquad \text{[Formula 11]}$$

As Formula 11, a solid earth an earth solid tide effect calculated from a model described in Reference Document: IERS Technical Note 36 (IERS Conventions 2010) (a vector representing deviation in the ECEF coordinate system) is used, for example. It is calculated with the G period, and is used as an input value for computing the carrier phase correction amount and the pseudorange correction amount in "RTCM 10402.3".

(A7. Phase Wind-up Effect Computation Section 170)

The phase wind-up effect computation section 170 acquires the satellite position, the approximate position, and the like from the satellite position calculation section 203, and using these and an existing phase wind-up model, calculates a phase wind-up effect wupL1 of the L1 band (an example of a position-dependent error) and a phase wind-up effect wupL2 of the L2 band (correction information of the position-dependent error).

The phase wind-up effect wupL1 is an error that varies depending on the position of the mobile station (the user), and is obtained by using a model frons the autonomous positioning results of the mobile station (the user) and "position information of the satellite calculated from the broadcast ephemeris", as in the case of the solid earth tide effect earthtide. The same also applies to the phase wind-up effect wupL2 of the L2 band. For example, it is obtained based on Reference Document ":Wu, J.T. Wu, S.C. Hajj, G.A. Bertiger, W.I. and Lichten, S.M., Effects of antenna orientation on GPS carrier phase, 1993.", as indicated below (: wavelength of the L1 band; wupL2 is also calculated similarly).

In the formulas below. there are D, x, and y without and with a prime symbol. It is indicated that those without the prime symbol relate to a receiving antenna, and those with the prime symbol relate to a satellite antenna. In the following, D denotes a dipole vector of the receiving antenna, D' denotes a dipole vector of the satellite antenna, and $\varphi(t)$ denotes a relative antenna rotation angle of the satellite and receiving antennas.

$$wupL1(t) = \lambda_1 (2N\pi + \phi(t)) \qquad \text{[Formula 12]}$$

$$N = nint\left[\frac{wupL1_{prev} - \varphi(t)}{2\pi}\right]$$

Note that $wupL1_{prev}$ is a value of wupL1 calculated at a previous time, and note Formula 13.

$$\phi(t) = \text{sign}(\zeta(t))\cos^{-1}\left(\frac{D'(t) \cdot D(t)}{|D'(t)||D(t)|}\right) \qquad \text{[Formula 13]}$$

$$D(t) = x(t) - k(t)(k(t) \cdot x(t)) + k(t) \times y(t)$$

$$D'(t) = x'(t) - k(t)(k(t) \cdot x'(t)) + k(t) \times y'(t)$$

$$k(t) = \frac{r_r(t) - r^s(t)}{|r_r(t) - r^s(t)|}$$

$$\zeta(t) = k(t) \cdot (D'(t) \times D(t))$$

Also note that nint( ) is a symbol representing an integer nearest to a numerical value in ( ), and sign( )is a symbol representing a sign of the numerical value in ( ). The GPS time included in the latest positioning reinforcement information on the order of centimeters is used as t.

$$k \quad \text{[Formula 14]}$$

Formula 14 indicates a line-of-sight unit vector when the receiver is seen from the satellite.

$$r^S = (x', y', z') \quad \text{[Formula 15]}$$

Formula 15 indicates a unit vector of a satellite body coordinate system.

$$r_r = (x, y, z) \quad \text{[Formula 16]}$$

Formula 16 indicates a local coordinate system unit vector of the mobile station (the user). It is calculated with the G period, and is used as an input value for computing the carrier phase correction amount and the pseudorange correction amount in "RTCM 10402.3".

(A8. Carrier Phase Correction Amount and Pseudorange Correction Amount (Conversion Computation Section 180)

Using the correction amounts derived in A1 to A7 above, the conversion computation section 180 computes the carrier phase correction amount CPC (Carrier Phase Correction) in Message Type 20 and the pseudorange correction amount PRC (PseudoRange Correction) in Message Type 21 of "RTCM 10402.3".

The conversion formulas are indicated below.

Note that C1PRC and so on (a plurality of types of positioning correction information conforming to the second specification) are as indicated below.

C1PRC: C/A-code pseudorange correction amount,
P2PRC: P-code pseudorange correction amount,
L1CPC: L1-band carrier phase correction amount, and
L2CPC: L2-band carrier phase correction amount.

$$C1PRC = \quad \text{[Formula 17]}$$
$$-\{CLK + ORB + TROP + ION + C1Bias + earthtide\}$$

$$P2PRC = -\left\{CLK + ORB + TROP + \left(\frac{f_1}{f_2}\right)^2 ION + P2Bias + earthtide\right\}$$

$$L1CPC = CLK + ORB + TROP - ION + L1Bias + earthtide + wupL1$$

$$L2CPC = CLK + ORB + TROP - \left(\frac{f_1}{f_2}\right)^2 ION + L2Bias + earthtide + wupL2$$

In the above formulas,

CLK denotes the satellite clock correction amount [m] described in A1 above,

ORB denotes the satellite orbit correction amount [m] described in A2 above,

TROP denotes the tropospheric delay amount [m] described in A5 above,

ION denotes the ionospheric delay amount [m] described in A4 above,

Bias denotes the satellite signal biases [m] described in A3 above, earthtide denotes the solid earth tide effect [m] described in A6 above, and wupL1 and wupL2 denote the phase wind-up effects [m] described in A7 above.

Each of CLK through wupL1 and wupL2 above is element data used for generating C1PRC and so on.

As described above, the phase wind-up effects are computed with the approximate position, the satellite position, and the like acquired from the satellite position calculation section 203.

According to the conversion device 103 described above, the positioning correction information included in the SSR message 401 is converted to the pseudorange correction amount (Message Type 21) and the carrier phase correction amount (Message Type 20) as defined by "RTCM 10402.3". Therefore, a receiver of an old generation supporting "RTCM 10402.3" can receive the SSR message 401 and perform positioning according to the network-type RTK scheme using existing virtual reference points as a reference station (VRS-RTK).

The first embodiment above has described the case where the SSR message as defined by "RTCM STANDARD 104012" (the first specification) is converted to the pseudorange correction amount (Message Type 21) and the carrier phase correction amount (Message Type 20) as defined by "RTCM 10402.3" (the second specification). However, "RTCM STANDARD 10403.2" which is the "first specification" of a conversion source and "RTCM 10402.3" which is the "second specification" of a conversion target are examples, and these are non-limiting.

More specifically, the first specification and the second specification described in the first embodiment above are as indicated below.

The first specification is the SSR message in "RTCM STANDARD 10403.2".

The second specification is Message Type 21 and Message Type 20 in "RTCM 10402.3".

<*Other Configurations*>

Figure 9:
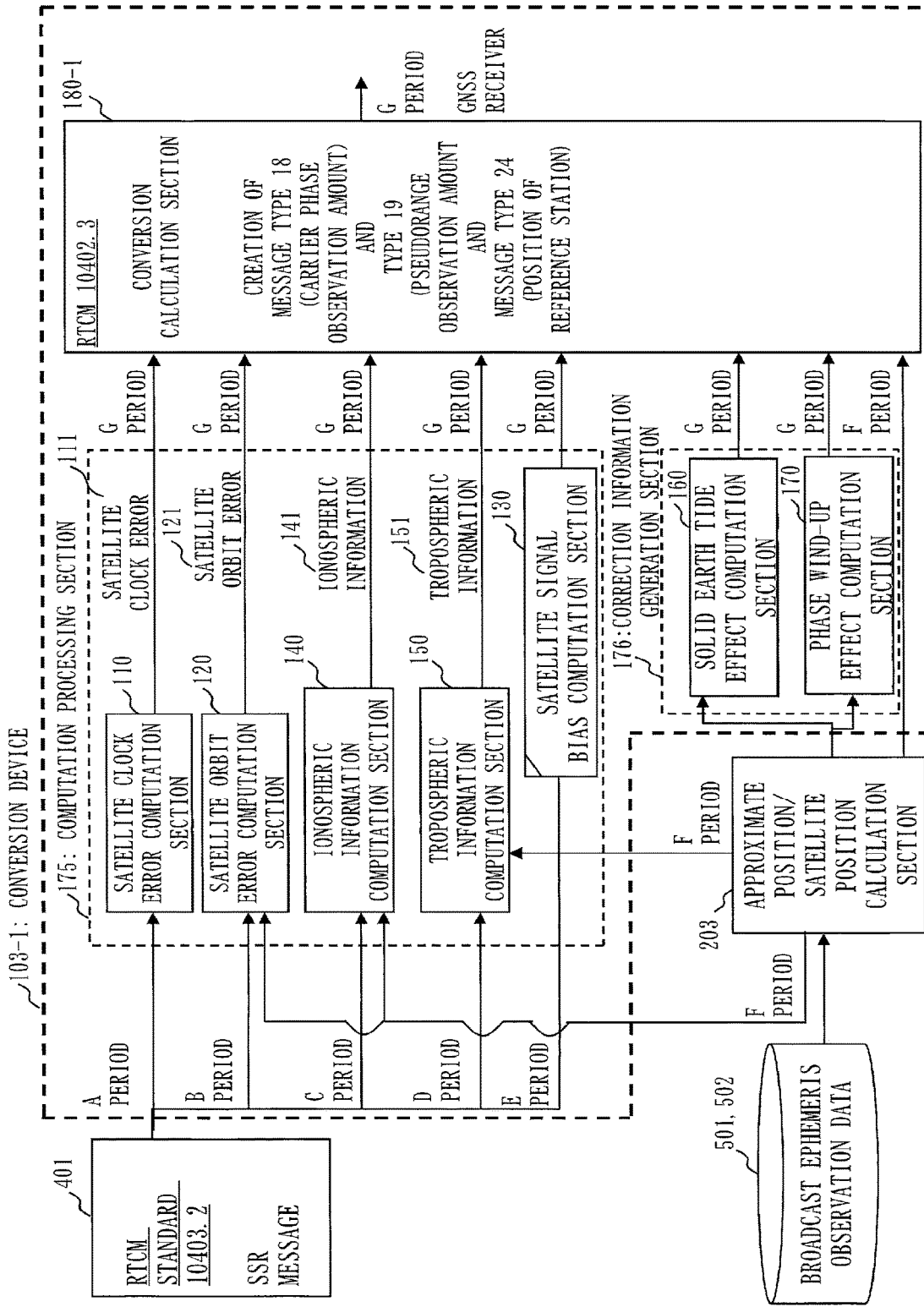
FIG. 9 is a diagram of the first embodiment and is a block diagram illustrating another configuration of the conversion device.
Figure 10:
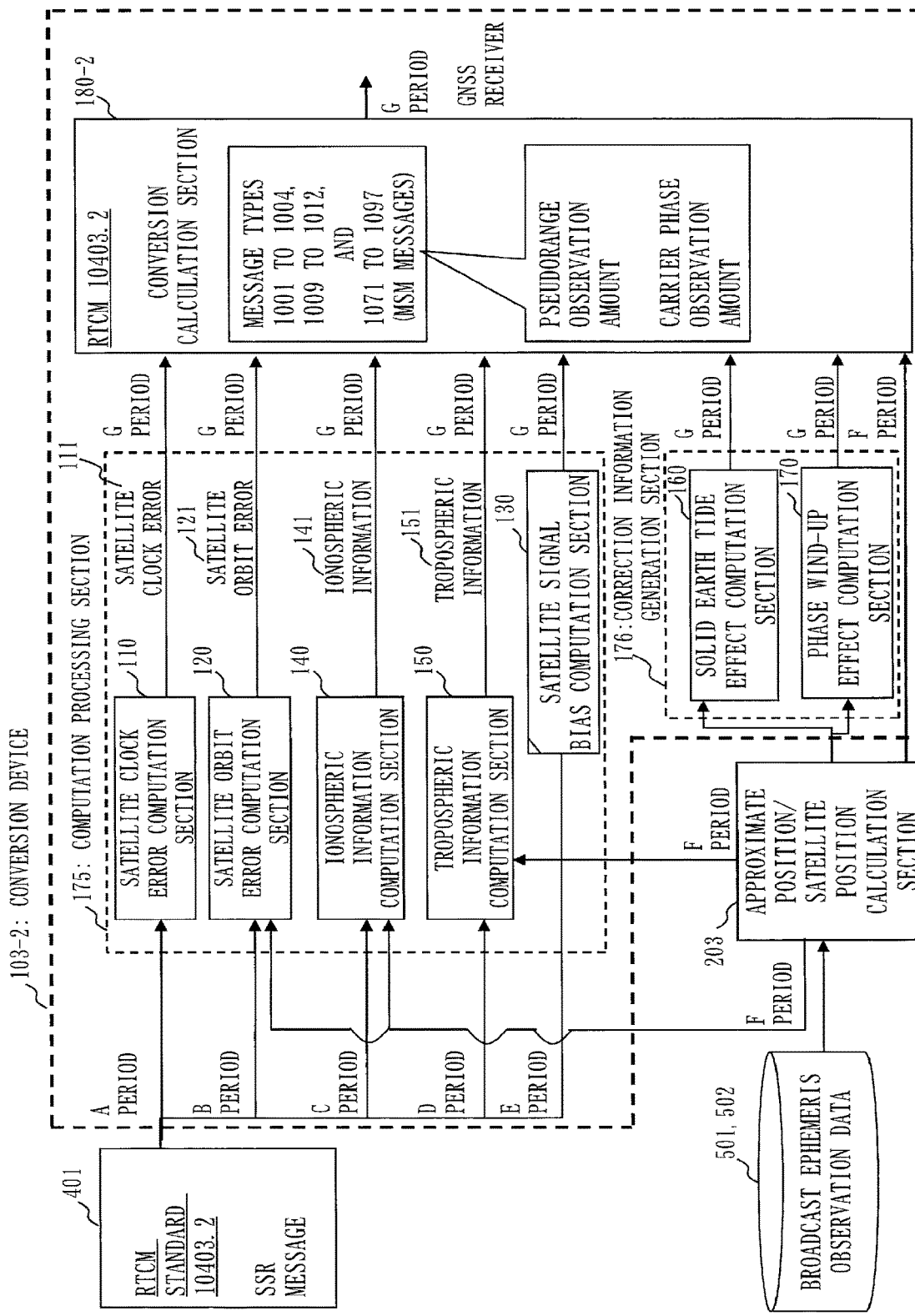
FIG. 10 is a diagram of the first embodiment and is a block diagram illustrating yet another configuration of the conversion device.

With reference to FIG. 9 and FIG. 10, Case 1 and Case 2 will be described as other configurations.

<Case 1>

Case 1 is a case in which the first specification and the second specification are as indicated below.

(1) The first specification is the SSR message in "RTCM STANDARD 10403.2".

(2) The second specification is Message Type 18 and Message Type 19 in "RTCM 10402.3". Message Type 18 relates to a carrier phase observation amount, and Message Type 19 relates to a pseudorange observation amount.

<Case 2>

Case 2 is a case in which the first specification and the second specification are as indicated below.

(1) The first specification is the SSR message in "RTCM STANDARD 10403.2" as in Case 1.

(2) The second specification is Message Types 1001 through 1004 and Message Types 1009 through 1012, as well as Message Types 1071 through 1097, which are MSM messages, in "RTCM 10403.2".

First, Case 1 will be described with reference to FIG. 9. In Case 1, a conversion computation section 180-1 adds a geometric distance p, between a satellite position of a satellite i and an approximate position to a pseudorange correction amount and a carrier phase correction amount obtained from the SSR message as defined by Message Types 1057 and later in "RTCM STANDARD 10403.2". When the geometric distance $\rho_i$ is added to the carrier phase correction amount, the geometric distance $\rho_i$ is converted to a phase. By adding the geometric distance $\rho_i$, Message Type 18 (the carrier phase observation amount) and Message Type 19 (the pseudorange observation amount) as defined by "RTCM 10402.3" are generated as positioning correction information conforming to the second specification of Case 1. The carrier phase observation amount and the pseudorange observation amount indicate virtual observation amounts at the approximate position.

(Configuration of Conversion Device 103-1)

With reference to FIG. 9, a configuration of a conversion device 103-1 in Case 1 will be briefly described. The conversion device 103-1 differs from the conversion device 103 of FIG. 6 in that the conversion computation section 180 is replaced with the conversion computation section 180-1, and that a satellite position calculation section 203 transmits the geometric distance $\rho_i$ between the satellite position ($X_i$, $Y_i$, $Z_i$) of the satellite i and the approximate position (x, y, z) to the conversion computation section 180-1. The geometric distance $\rho_i$ is defined by the following formula.

$$\rho_i = ((X_i - x)^2 + (Y_i - y)^2 + (Z_i - z)^2)^{1/2}$$

(Operation of Conversion Device 103-1)

(1) The conversion device 103-1 differs from the conversion device 103 in that the conversion computation section 180-1 adds the geometric distance $\rho_i$ to the pseudorange correction amount and the carrier phase correction amount, and thereby generates the carrier phase observation amount of Message Type 18 of the second specification and the pseudorange observation amount of Message Type 19 of the second specification.

(2) That is, in the conversion device 103-1, a computation processing section 175 generates a plurality of pieces of element data, such as a satellite clock error, a satellite orbit error, ionospheric information, and tropospheric information, based on the SSR messages 401, as in the conversion device 103.

(3) The conversion computation section 180-1 generates the pseudorange correction amount and the carrier phase correction amount based on the plurality of pieces of element data generated by the computation processing section 175. The operation up to this point is the same as that of the conversion device 103.

(4) Then, the conversion computation section 180-1 adds the geometric distance $\rho_i$ to the pseudorange correction amount and the carrier phase correction amount, and thereby generates the carrier phase observation amount of Message Type 18 of the second specification and the pseudorange observation amount of Message Type 19 of the second specification.

(5) The carrier phase observation amount of Message Type 18 and the pseudorange observation amount of Message Type 19 are positioning correction information conforming to the second specification. In this way, the conversion computation section 180-1 generates the carrier phase observation amount and the pseudorange observation amount being a plurality of pieces of positioning correction information conforming to the second specification, based on the plurality of pieces of element data generated by the computation processing section 175.

In the above case, the satellite position calculation section 203 transmits the geometric distance $\rho_i$ to the conversion computation section 180-1. However, the conversion computation section 180-1 receives the satellite position ($X_i$, $Y_i$, $Z_i$) of the satellite i and the approximate position (x, y, z) from the satellite position calculation section 203. Therefore, the conversion computation section 180-1 may compute the geometric distance $\rho_i$.

Next, Case 2 will be described with reference to FIG. 10. In Case 2, a conversion computation section 180-2 adds the geometric distance $\rho_i$ described in Case 1 to a pseudorange correction amount and a carrier phase correction amount obtained from the SSR message as defined by Message Types 1057 and later in "RTCM STANDARD 10403.2". When the geometric distance $\rho_i$ is added to the carrier phase correction amount, the geometric distance $\rho_i$ is converted to a phase. By adding the geometric distance $\rho_i$, a carrier phase observation amount and a pseudorange observation amount as defined by Message Types 1001 through 1004 and Message Types 1009 through 1012, as well as Message Types 1071 through 1097, which are MSM messages, in "RTCM STANDARD 10403.2" are generated as positioning correction information conforming to the second specification of Case 2. The carrier phase observation amount and the pseudorange observation amount represent virtual observation amounts at the approximate position.

(Configuration of Conversion Device 103-2)

With reference to FIG. 10, a configuration of a conversion device 103-2 in Case 2 will be briefly described. The conversion device 103-2 differs from the conversion device 103 of FIG. 6 in that the conversion computation section 180 is replaced with the conversion computation section 180-2, and that a satellite position calculation section 203 transmits the geometric distance $\rho_i$ between the satellite position ($X_i$, $Y_i$, $Z_i$) of the satellite i and the approximate position (x, y, z) to the conversion computation section 180-2. The geometric distance $\rho_i$ is as described in Case 1.

(Operation of Conversion Device 103-2)

(1) The conversion device 103-2 differs from the conversion device 103 in that the conversion computation section 180-2 adds the geometric distance $\rho_i$ to the pseudorange correction amount and the carrier phase correction amount, and thereby generates the carrier phase observation amount and the pseudorange observation amount according to the second specification.

(2) That is, in the conversion device 103-2, a computation processing section 175 generates a plurality of pieces of element data, such as a satellite clock error, a satellite orbit error, ionospheric information, and tropospheric information, based on the SSR message 401, as in the conversion device 103.

(3) The conversion computation section 180-2 generates the pseudorange correction amount and the carrier phase correction amount based on the plurality of pieces of element data generated by the computation processing section 175. The operation up to this point is the same as that of the conversion device 103.

(4) Then, the conversion computation section 180-2 adds the geometric distance $\rho_i$ to the pseudorange correction amount and the carrier phase correction amount, and thereby generates the pseudorange observation amount and the carrier phase observation amount according to the second specification.

(5) The generated carrier phase observation amount and pseudorange observation amount are positioning correction information conforming to the second specification. In this way, the conversion computation section 180-2 generates the carrier phase observation amount and the pseudorange observation amount being a plurality of pieces of positioning correction information conforming to the second specification, based on the plurality of pieces of element data generated by the computation processing section 175. As in the case of Case 1, the conversion computation section 180-2 may compute the geometric distance $\rho_i$.

The first specification described above is a specification in which a parameter being a state amount for positioning reinforcement is defined for each positioning error source that causes a positioning error. The parameter is exemplified by the polynomial coefficients C0, C1, and C2 included in the satellite clock error information in the SSR message mentioned in the calculation formula for CLK(t).

The second specification described above is a specification in which at least one of an observation amount used for positioning and a correction amount of the observation amount is defined. More specifically, the second specification described above is the specification in which is defined at least one pair of a pair of a pseudorange observation amount and a carrier phase observation amount being observation amounts used for positioning and a pair of a correction amount of the pseudorange observation amount and a correction amount of the carrier phase observation amount.

Second Embodiment (Example Hardware Configuration)

Figure 11:
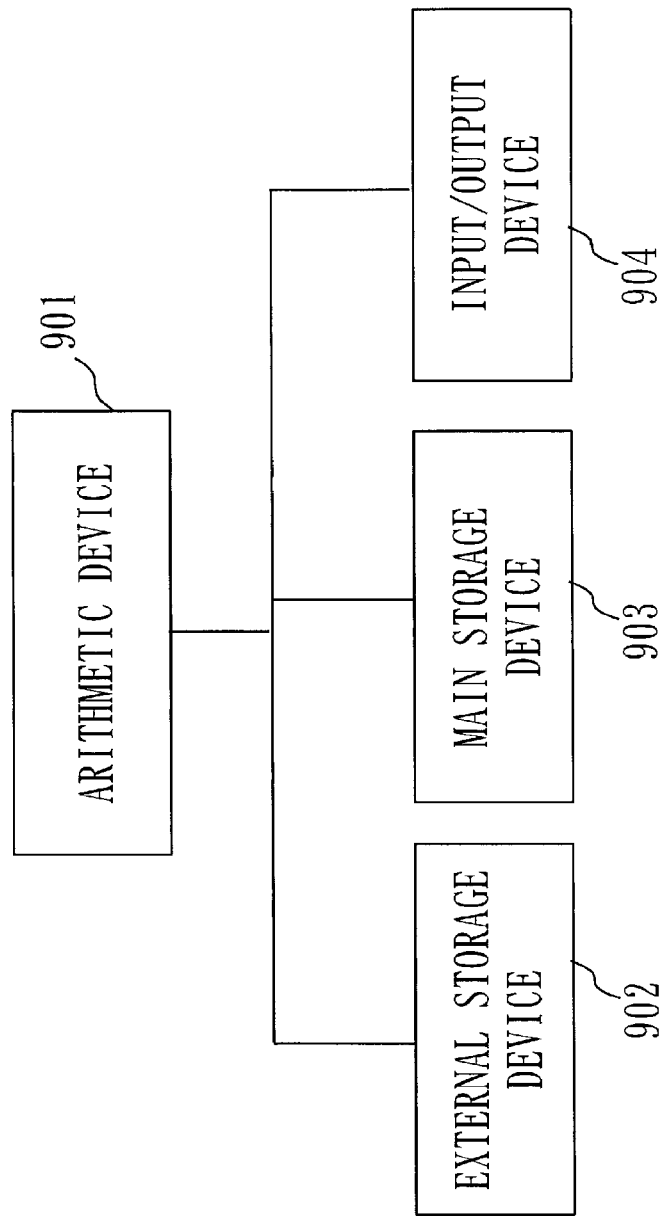
FIG. 11 is a diagram of a second embodiment illustrating an example hardware configuration of the conversion device.

FIG. 11 is a diagram illustrating an example hardware configuration of the conversion device 103. With reference to FIG. 11, the example hardware configuration of the conversion device 103 presented in the first embodiment will be described. The conversion device 103 is a computer, and each element of the conversion device 103 can be implemented by a program. As the hardware configuration of the conversion device 103, an arithmetic device 901, an external storage device 902, a main storage device 903, and an input/output device 904 are connected to a bus.

The arithmetic device 901 is a CPU (Central Processing Unit) that executes programs. The external storage device 902 is, for example, a ROM (Read Only Memory), a flash memory, and a bard disk device. The main storage device 903 is a RAM (Random Access Memory).

The programs are normally stored in the external storage device 902 and are loaded into the main storage device 903 to be sequentially read and executed by the arithmetic device 901. The programs are those that implement the functions each described as a "section" illustrated in FIG. 6, FIG. 9, and FIG. 10. Further, the external storage device 902 also stores an operating system (OS), and at least a part of the OS is loaded into the main storage device 903. The arithmetic device 901 executes the program for implementing the function of each "section" illustrated in FIG. 6, FIG. 9, and FIG. 10 while executing the OS. Information, data, signal values, and variable values indicating results of processing described as "generate", "create", "calculate", "compute", "determine", "decide", "update", "estimate", "extract", "select", "receive", and so on in the description of the first embodiment are stored as files in the main storage device 903.

Note that the configuration of FIG. 11 indicates an example of the hardware configuration of the conversion device 103, and the hardware configuration of the conversion device 103 is not limited to the configuration described in FIG. 11 and may be another configuration.

Specifically, a "section" may be provided by "circuitry". Also, a "section" may be replaced with a "circuit", a "step", a "procedure", or "processing". The "circuit" and "circuitry" are a concept that encompasses other types of processing circuits, such as a logic IC, a GA (Gate Array), an ASIC (Application Specific Integrated Circuit), and an FPGA (Field-Programmable Gate Array).

REFERENCE SIGNS LIST 91, 92, 93: errors; 94: grid point; 100: conversion unit; 101: antenna; 102: receiving section; 103: conversion device; 110: satellite clock error computation section; 120: satellite orbit error computation section; 130: satellite signal bias computation section; 140: ionospheric information computation section; 150: tropospheric information computation section; 160: solid earth tide effect computation section; 170: phase wind-up effect computation section; 175: computation processing section; 176: correction information generation section; 180: conversion computation section; 200: positioning unit; 201: antenna; 202: receiving section; 203: satellite position calculation section; 204: high-accuracy positioning section; 300: positioning device; 301: antenna; 302: receiving section; 400: quasi-zenith satellite; 401: SSR message; 500: OPS satellite; 501: observation data; 502: broadcast ephemeris; 901; arithmetic device; 902: external storage device; 903; main storage device; 904: input/output device.

The invention claimed is:

1. A conversion device comprising:
    computation processing circuitry configured to acquire a plurality of types of positioning correction information used for correcting a positioning error resulting from a satellite that transmits positioning information and a positioning error resulting from a propagation path of the positioning information, approximate position being a positioning result, and a satellite position and a satellite velocity of the satellite that transmits the positioning information based on which the approximate position is calculated, the positioning correction information being defined for each error source in positioning of a mobile body and being included in a state amount message for positioning reinforcement, and based on the plurality of types of positioning correction information, the approximate position, the satellite position, and the satellite velocity of the satellite that have been acquired, generate a plurality of types of element data which are elements used for generating a plurality of types of positioning correction information which are different from the types of positioning correction information included in the state amount message, by computation; and
    conversion calculation circuitry configured to combine the plurality of types of element data generated by the computation processing circuitry, to generate a plurality of types of positioning correction information indicating at least one of an observation amount used for positioning and a correction amount of the observation amount, by computation, as the plurality of types of positioning correction information which are different from the types of positioning correction information included in the state amount message.

2. The conversion device according to claim 1, further comprising:
    correction information generation section circuitry configured to generate, as element data, correction information for correcting a position-dependent error which is an error resulting from a positioning position, based on the approximate position and the satellite position,
    wherein the conversion calculation circuitry is further configured to combine the plurality of types of element data generated by the computation processing circuitry and a plurality of pieces of the element data generated by the correction information generation circuitry, to generate the plurality of types of positioning correction information which are different from the types of positioning correction information included in the state amount message.

3. The conversion device according to claim 2, wherein the correction information generation circuitry generates element data corresponding to a solid earth tide effect and element data corresponding to a phase wind-up effect.

4. The conversion device according to claims 1, wherein the computation processing circuitry acquires a satellite orbit error, a satellite signal bias, and a satellite clock error, as each piece of the positioning correction information for correcting the positioning error resulting from the satellite that transmits the positioning information, and acquires tropospheric delay information and ionospheric delay information as each piece of the positioning correction information for correcting the positioning error resulting from the propagation path of the positioning information.

5. The conversion device according to claims 1, wherein the plurality of types of positioning correction information included in the state amount message conform to an RTCM Standard 10403.2, and the plurality of types of positioning correction information which are different from the types of positioning correction information included in the state amount message conform to an RTCM Standard 10402.3.

6. A non-transitory computer readable medium storing a program for causing a computer to execute processing comprising:

acquiring a plurality of types of positioning correction information used for correcting a positioning error resulting from a satellite that transmits positioning information and a positioning error resulting from a propagation path of the positioning information, an approximate position being a positioning result, and a satellite position and a satellite velocity of the satellite that transmits the positioning information based on which the approximate position is calculated, the positioning correction information being defined for each error source in positioning of a mobile body and being included in a state amount message for positioning reinforcement, and based on the plurality of types of positioning correction information, the approximate position, and the satellite position and the satellite velocity of the satellite that have been acquired, generate a plurality of types of element data which are elements used for generating a plurality of types of positioning correction information which are different from the types of positioning correction information included in the state amount message, by computation; and combining the plurality of types of element data that have been generated, to generate a plurality of types of positioning correction information indicating at least one of an observation amount used for positioning and a correction amount of the observation amount, by computation, as the plurality of types of positioning correction information which are different from the types of positioning correction information included in the state amount message.

7. The non-transitory computer readable medium according to claim 6, wherein the plurality of types of positioning correction information included in the state amount message conform to an RTCM Standard 10403.2, and the plurality of types of positioning correction information which are different from the types of positioning correction information included in the state amount message conform to an RTCM Standard 10402.3.

8. A conversion method, comprising:

acquiring a plurality of types of positioning correction information used for correcting a positioning error resulting from a satellite that transmits positioning information and a positioning error resulting from a propagation path of the positioning information, an approximate position being a positioning result, and a satellite position and a satellite velocity of the satellite that transmits the positioning information based on which the approximate position is calculated, the positioning correction information being defined for each error source in positioning of a mobile body and being included in a state amount message for positioning reinforcement, and based on the plurality of types of positioning correction information, the approximate position, and the satellite position and the satellite velocity of the satellite that have been acquired, and thereby generating a plurality of types of element data which are elements used for generating a plurality of types of positioning correction information which are different from the types of positioning correction information included in the state amount message; and combining the plurality of types of element data that have been generated, and thereby generating a plurality of types of positioning correction information indicating at least one of an observation amount used for positioning and a correction amount of the observation amount, by computation, as the plurality of types of positioning correction information which are different from the types of positioning correction information included in the state amount message.

* * * * *